(12) United States Patent
Spiteri

(10) Patent No.: US 11,316,811 B2
(45) Date of Patent: Apr. 26, 2022

(54) PERSONALIZED-MESSAGING SYSTEM AND METHOD FOR CAKES AND GIFT ARRANGEMENTS

(71) Applicant: Sal Anthony Spiteri, Miller Place, NY (US)

(72) Inventor: Sal Anthony Spiteri, Miller Place, NY (US)

( * ) Notice: Subject to any disclaimer, the term of this patent is extended or adjusted under 35 U.S.C. 154(b) by 151 days.

(21) Appl. No.: 16/284,028

(22) Filed: Feb. 25, 2019

(65) Prior Publication Data

US 2019/0268290 A1   Aug. 29, 2019

Related U.S. Application Data

(60) Provisional application No. 62/635,596, filed on Feb. 27, 2018.

(51) Int. Cl.
| | | |
|---|---|---|
| *H04L 51/10* | (2022.01) | |
| *H04L 51/08* | (2022.01) | |
| *G06F 21/32* | (2013.01) | |
| *H04L 29/06* | (2006.01) | |
| *H04L 9/40* | (2022.01) | |
| *G06F 21/60* | (2013.01) | |

(52) U.S. Cl.
CPC ............. *H04L 51/10* (2013.01); *G06F 21/32* (2013.01); *H04L 51/08* (2013.01); *H04L 63/0428* (2013.01); *G06F 21/602* (2013.01)

(58) Field of Classification Search
CPC ..... H04L 51/10; H04L 51/08; H04L 63/0428; H04L 51/02; G06F 21/602; G06F 21/32
See application file for complete search history.

(56) References Cited

U.S. PATENT DOCUMENTS

| | | | |
|---|---|---|---|
| 8,011,122 B2 * | 9/2011 | Clegg | G11B 33/08 40/124.03 |
| 8,711,556 B2 | 4/2014 | Salatandre | |
| 8,719,033 B2 * | 5/2014 | Lien | A63H 33/38 434/319 |
| 8,964,397 B2 | 2/2015 | Salatandre | |
| 9,031,869 B2 * | 5/2015 | Glass | G06Q 30/0621 705/26.5 |
| 9,070,149 B2 * | 6/2015 | Lin | G06Q 30/0601 |
| 9,171,404 B1 * | 10/2015 | Johnson | H04N 1/32128 |
| 10,460,371 B2 * | 10/2019 | DeLuca | G06Q 30/0621 |
| 2004/0139318 A1 * | 7/2004 | Fiala | G06F 21/10 713/165 |

(Continued)

FOREIGN PATENT DOCUMENTS

| | | | |
|---|---|---|---|
| CA | 2756402 A1 | 4/2013 | |
| CA | 2790451 A1 | 3/2014 | |

(Continued)

OTHER PUBLICATIONS

Americhip Video Brochures webpage, retrieved on Sep. 22, 2019 from https://www.americhip.com/product/video-brochures.html (3 pages).

(Continued)

*Primary Examiner* — Uzma Alam

(57) ABSTRACT

The present invention relates to systems and methods for providing personalized digital messages, such as audio-visual messages, on a device that is used to create personalized associated items and gift arrangements.

16 Claims, 10 Drawing Sheets

(56) References Cited

U.S. PATENT DOCUMENTS

| | | | | |
|---|---|---|---|---|
| 2004/0177114 | A1* | 9/2004 | Friedman | G06Q 30/0633 709/246 |
| 2005/0102867 | A1* | 5/2005 | Youngdahl | B42D 15/022 40/124.11 |
| 2008/0113614 | A1* | 5/2008 | Rosenblatt | G06Q 10/1093 705/26.1 |
| 2008/0305738 | A1* | 12/2008 | Khedouri | G06F 16/4387 348/E7.071 |
| 2010/0017301 | A1* | 1/2010 | Alva | G06Q 10/107 705/26.1 |
| 2010/0029253 | A1* | 2/2010 | Han | H04L 12/2803 455/414.2 |
| 2010/0241939 | A1* | 9/2010 | Rozen-Atzmon | H04N 1/00164 715/202 |
| 2012/0011751 | A1* | 1/2012 | Schimke | G09F 1/04 40/124.03 |
| 2012/0096379 | A1* | 4/2012 | Bell | H04L 29/06 715/769 |
| 2012/0271732 | A1* | 10/2012 | Glass | G06Q 30/0621 705/26.5 |
| 2013/0024771 | A1* | 1/2013 | Satterley | H04L 65/4084 715/748 |
| 2013/0232221 | A1* | 9/2013 | Brechner | G06Q 30/06 709/217 |
| 2014/0163706 | A1* | 6/2014 | Wilen | G07F 17/3295 705/14.19 |
| 2014/0325362 | A1* | 10/2014 | Potts | G06F 40/197 715/732 |
| 2015/0052788 | A1* | 2/2015 | Juetten | B42D 15/042 40/124.09 |
| 2015/0213535 | A1* | 7/2015 | Glass | G06Q 30/0641 705/26.5 |
| 2016/0203473 | A1* | 7/2016 | Curtis | G06Q 20/354 705/41 |
| 2016/0337323 | A1* | 11/2016 | Lester | H04L 9/00 |
| 2016/0337799 | A1* | 11/2016 | Johnson | H04W 12/069 |
| 2017/0036812 | A1* | 2/2017 | Speck | B65D 43/02 |
| 2017/0200193 | A1* | 7/2017 | Bigley | G06Q 30/0621 |
| 2017/0285350 | A1* | 10/2017 | Osterhout | G02B 27/0179 |
| 2018/0063052 | A1* | 3/2018 | Harrison | G06F 3/04883 |
| 2019/0051274 | A1 | 2/2019 | Salatandre | |

FOREIGN PATENT DOCUMENTS

| | | | | |
|---|---|---|---|---|
| CA | 2867305 A1 | | 4/2015 | |
| EP | 1801748 A1 | * | 6/2007 | G06Q 30/00 |
| WO | WO-2005004456 A1 | * | 1/2005 | G07F 7/0866 |

OTHER PUBLICATIONS

BigDAWGS Birthday Balloon Bouquet—Birthday Video Greeting Card webpage, retrieved Sep. 18, 2019 from https://bigdawgsgreetings.com/product/birthday-balloon-bouquet-birthday-video-greeting-card/ (4 pages.).

Google Search: digital picture frame. Webpage retrieved on Sep. 18, 2019 from https://www.google.com/search?q=digital+picture+frame&rlz=1C1GGRV_enUS754US75 . . . (5 pages).

VideoSmartbooks Video Brochures webpage, retrieved on Sep. 18, 2019 from https://www.videosmartbooks.com/video-brochures-2018/ (8 pages).

* cited by examiner

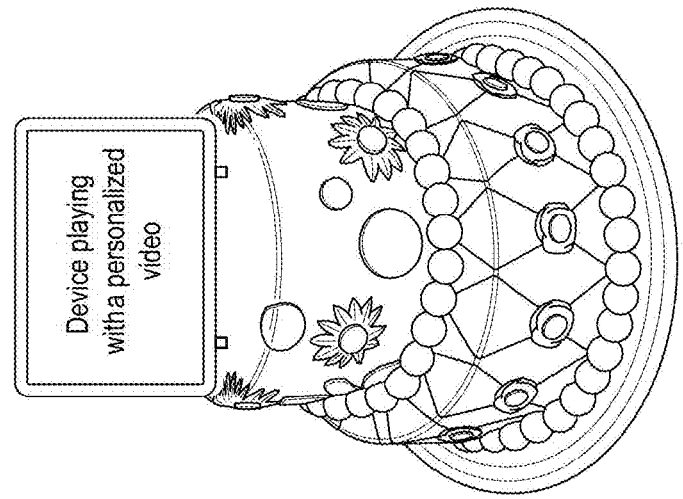
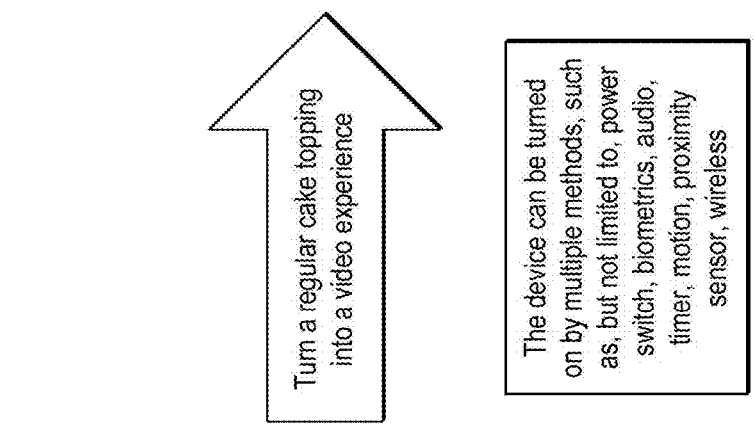
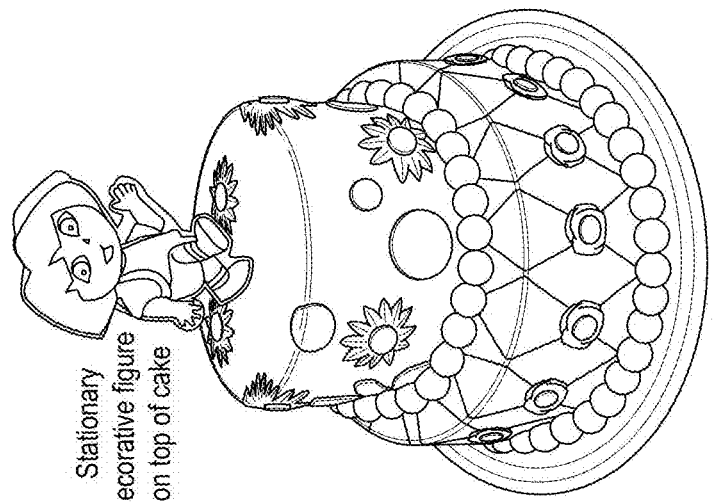
FIG. 4

PERSONALIZED-MESSAGING SYSTEM AND METHOD FOR CAKES AND GIFT ARRANGEMENTS

REFERENCE TO PRIOR APPLICATIONS

This application claims the benefit of U.S. Provisional Application Ser. No. 62/635,596 filed on Feb. 27, 2018, the disclosure of which is hereby incorporated by reference in its entirety.

FIELD OF THE DISCLOSURE

The present invention relates to systems and methods for providing personalized digital messages such as audio-visual messages, on a device that is used to personalize associated items, creating personalized arrangements. In a preferred embodiment, the audio-visual messages are used in association with such items as cakes and various gift arrangements.

BACKGROUND

Celebrating special events has been an integral part of culture worldwide for centuries. Cakes, flowers, and other arrangements and gifts have been a means to express one's feelings for another person. People always look to create a unique memory for that special person and will go out of their way to make an unforgettable impression.

Adding unique and/or customized messages has evolved from simply writing on a card or using cake icing to include words, such as "Happy Birthday," "Congratulations," "Good Luck," "Get Well," to now being able to apply edible prints of an image on the cake. The next evolution is being able to add a personalized digital experience to the presentation in a seamless manner.

One existing problem today is a lack of a system and method that enables the addition of personalized digital messages on a device that is associated with another presentation item, such as a flower bouquet, cake, fruit basket, or other gift item.

Another existing problem is that consumers do not have an affordable, easy and seamless software application process to provide a customized digital message on a device to further personalize associated items, such as flower arrangements, cakes, fruit baskets, or other gift items. Accordingly, there is a need for a novel and unconventional system and method that enables provision of personalized digital messages on a device that may be associated with other items, such as flower arrangements, cakes, fruit baskets, or other gift items.

There is also a need for a system and device that provides a consumer with an efficient online process and experience to load customized digital messages for association with other presentation items, such as gift items. The device can be used as a keepsake or easily reused by downloading new files for the next occasion.

Another object of the invention is to provide a novel and unconventional system and a device that would have an ergonomic shape, low cost, and have an efficient user interface.

Another object of the invention is to provide a system that delivers personalized messages to a device in an encrypted form, wherein the messages are decrypted using a decryption key and, upon verification (e.g., device specific verification), retrieved from the device's memory for use upon end-user-specific triggered event.

SUMMARY OF THE INVENTION

The present invention involves a novel and unconventional system and method for providing personalized digital messages on a device that may be used in association with other presentation items, such as personalized cakes, flower bouquets, or other gifts, to create personalized-messaging arrangements.

In one embodiment, the system includes a handheld digital personalized-messaging device running a custom software application. The personalized-messaging device may be used as a standalone apparatus associated with an item, mounted on an associated item, such as a cake, or coupled to a part of an associated item, such as a flower bouquet or a fruit basket. The latter option may be accomplished by having mounting features on the device that are used to effectively secure the device onto the item.

In one embodiment, the personalized-messaging device includes the following features, which are used to provide a unique user experience.

Display, of a size that is appropriate for the size of the cake or arrangement being used,
Processing and control circuitry, such as a Central Processing Unit ("CPU")
USB connection for communications and charging
Rechargeable or non-rechargeable Battery
Speaker
Microphone (used as a sensor to detect/record voice or to detect blowing out of cake candles to then trigger a digital video or audio event on the device)
Biometric sensor, such as an end-user fingerprint and/or retina identification subsystem;
Light/proximity sensor to be used to trigger an action, such as activating of the display, changing of menu modes or changing the display parameters, such as brightness;
Accelerometer for picture orientation control
Bluetooth and/or WiFi for wireless communication to the device;
Buttons (Power, Up/Down, Select, Mute);
Memory to store files;
Backlight (used for visibility and special visual effects);
Mounts horizontally directly onto a cake or vertically with add-on mounting elements, such as sticks;
Multiple mounting sticks that connect to each other in order to increase and customize the stem length to be used in flower, arrangements; and
Menu mode, which allows a user to select other files, enter web download mode, view memory & battery status, or record a message, provides option settings and instructions.

A software application (web and mobile) provides a full-service seamless experience to customize a message, picture, or video file. The file is then formatted with a unique file wrapper that enables the file to be downloaded to the personalized-messaging device via an interface, such as a USB interface. While the device, is connected to a website for downloading an encrypted file and its wrapper therefrom, the device may return an acknowledgement to the website using the encrypted wrapper to confirm a successful download.

The device may be pre-loaded with sample images and/or files that are generated with the Personalized Messaging Device online software application and then can be downloaded to the device.

The $3^{rd}$ Party software website can be used to access online gift entities and create the customized file in order to link to one's gift arrangement order. The transaction is completed after the local gift shop updates the device with the customer's pre-ordered file.

Once the end user turns on the device, the loaded file will run (play). In one embodiment, the loaded file will run in a repeat loop mode until the user stops the process.

The Personalized Messaging Device User Menu Mode allows for additional options to customize the experience.

BRIEF DESCRIPTION OF THE FIGURES

The accompanying figures, in which like reference numerals refer to identical or functionally similar elements throughout the separate views, together with the detailed description below, are incorporated in and form part of the specification, and serve to further illustrate embodiments of concepts that include the claimed invention and explain various principles and advantages of those embodiments.

FIG. 4 shows how a regular cake can be turned into a unique presentation package in accordance with some embodiments of the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

The following detailed description discloses some embodiments of the system of the present invention, including a personalized-messaging device that is used to provide personalized audio-visual messages in combination with associated, items to a target audience.

Figure 1:
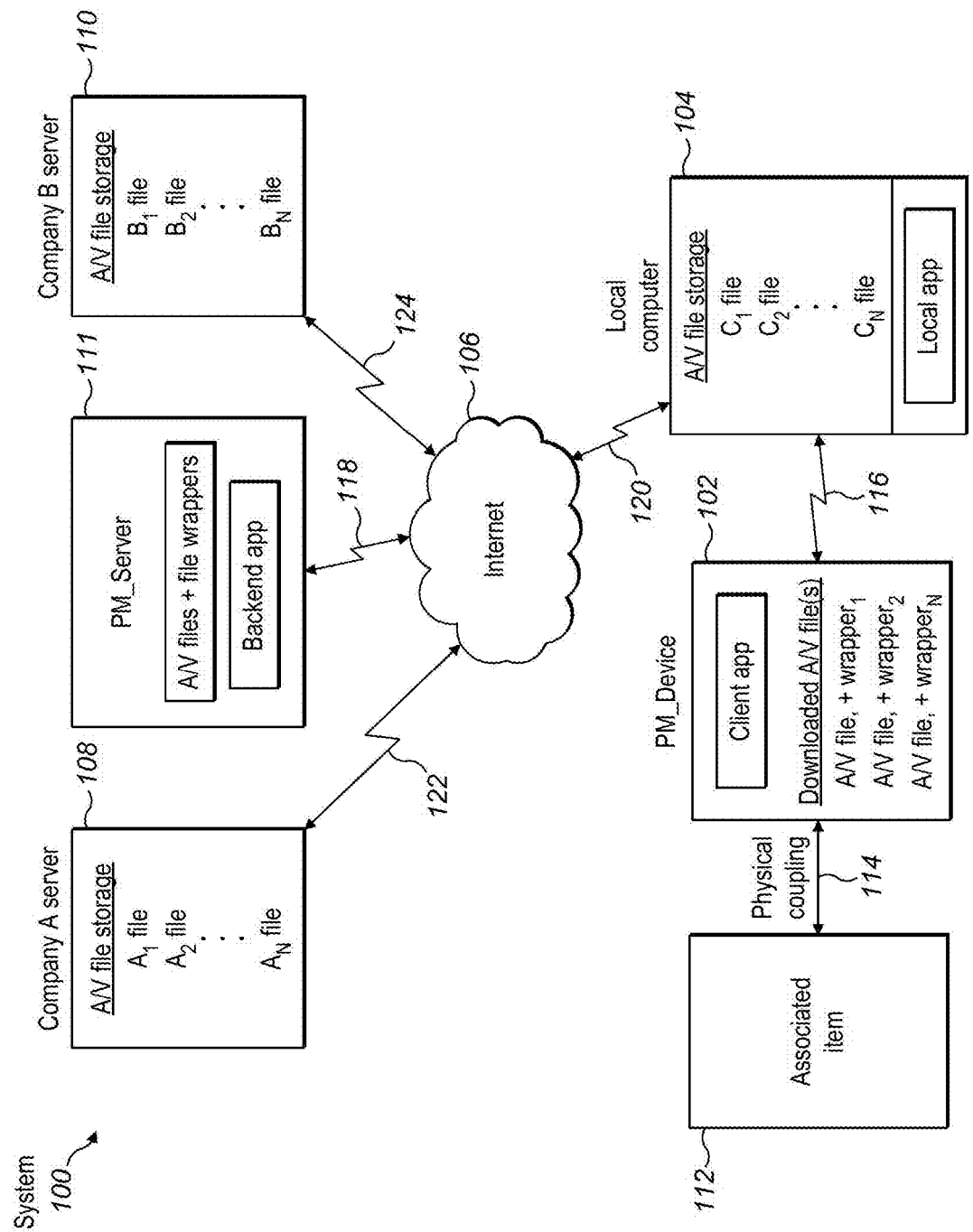
FIG. 1 is a diagram of a system in accordance with some embodiments of the present invention.

FIG. 1 is a diagram of a system 100 in accordance with some embodiments of the present invention. The system 100 includes a personalized-messaging device ("PM_Device") 102 that is communicatively coupled via a local computer 104 and the Internet to a personal-messaging server ("PM_Server") 111. The local computer 104 could be a desktop computer or a mobile computer/device. The PM_Device 102 is communicatively coupled to the local computer 104 via a bidirectional communication link 116, which may be a hardwired link (e.g., Universal Serial Bus ("USB")) or a wireless link (e.g., Bluetooth or WiFi). When communicating with the PM_Server 111 through the local computer 104, bidirectional communication is achieved via the following path: link 118 between the PM_Server 111 and the Internet 106, followed by link 120 between the Internet 106 and the local computer 104 computer, followed by link 116 between the local computer 104 and the PM_Device 102.

Also shown in FIG. 1 are remote servers 108 and 110, each of which may contain an audio-visual file of interest. These files can be uploaded to the PM_Server through an internet connection via 118, 122 or 124.

One purpose of the PM_Device is to store personalized audio-visual messages in its memory and to present those messages to a target audience at an appropriate triggering event, such as reaching a specific time or detecting a trigger.

An audio-visual message could be an audio-only message, an image-only (moving or still) message, or a combination of both. The personalized messages are stored in the PM_Device's memory, which also stores a client software application ("CLIENT APP") that is used to download the messages to the device from the PM_Server 111, and to present them upon occurrence of an appropriate trigger event.

As shown in FIG. 1, remote servers 108 and 110 and local computer 104 each may include one or more audio-visual message files ($A_1$-An, $B_1$-Bn, and $C_1$-Cn, respectively). Using a software on the local computer (LOCAL APP") an audio-visual file of interest, originally located either on the local computer 104 or on one of the remote servers (108 or 110), is first uploaded (saved) to the PM_Server 111, at which point a file identification information is saved in the PM_Server 111 together with the file. The file identification information includes a file wrapper, which itself could include such fields as file-source name, customer identifier, order number, order date- or file ID, etc. In addition to the file wrapper, the file identification information could include a check sum for error correction. Afterwards, the LOCAL APP on the local computer 104 is used to access the file in the PM_Server 111 and to download the file and its identification information from the PM_Server 111 to the PM_Device 102, via the local computer 104. The downloaded audio-Visual file gets stored in the PM_Device's memory, for retrieval and play at an appropriate triggering event.

In some embodiments of the invention, the audio-visual file, originally located either on a remote server 108 or 110 or on a local computer 104, may be modified by the user prior to its upload to the PM_Server 111. In another embodiment, the file may be modified after its upload to the PM_Server 111.

In some embodiments, the PM_Server 111, using its BACKEND APP software, is programmed to encrypt the audio-visual file and its file-wrapper before their transmission from the PM_Server 111 to the PM_Device 102. In such a case, the CLIENT APP in the PM_Device decrypts the received information prior to being able to play the file on the PM_Device 102 after a triggering event.

In use, the PM_Device 102 may be physically coupled to an associated item 112, which may be a cake, a flower arrangement, or another presentation item, via a coupler 114. Coupling could be achieved by any type of connection known in the art, including mechanical (e.g., by pins, rubber band, clamp, etc.), chemical (e.g., glue, etc.), or other means.

Figure 2:
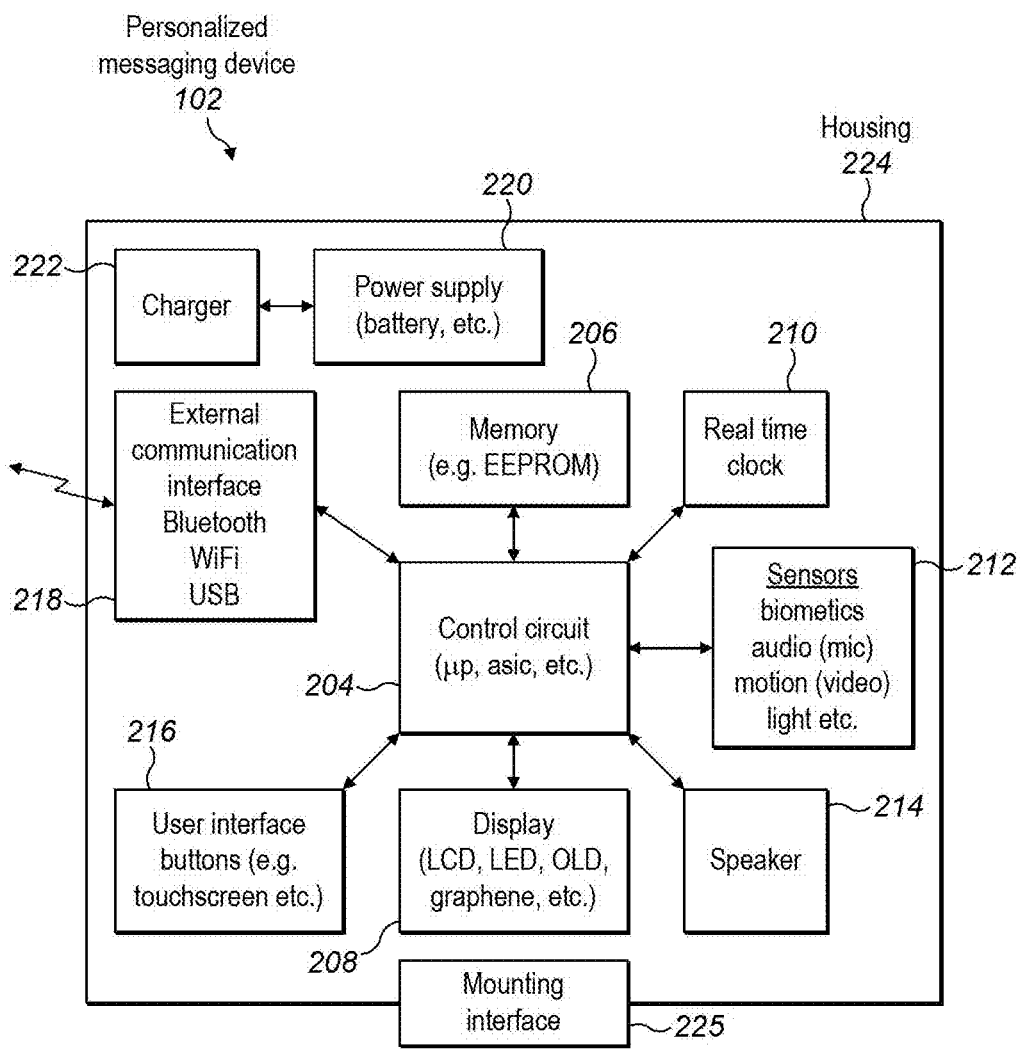
FIG. 2 is a diagram of a personalized-messaging device in accordance with some embodiments of the present invention.

FIG. 2 is a diagram of a personalized-messaging device 102 in accordance with some embodiments of the present invention. As shown in FIG. 2, the PM_Device 102 comprises circuitry 204, which includes a microprocessor ("µP"), an analog-specific-integrated circuit ("ASIC"), and/or any other circuitry that controls operation of the PM_Device. The control circuit 204 is electrically coupled to memory 206, display 208 of an appropriate size (for example, 2" to 8"), a real time clock 210, sensors 212, speaker 214, user interface 216, and external-communications interface 218.

Memory 206 stores an application program for accessing and downloading an audio-visual file for later presentations to a target audience. Memory also includes instructions for decrypting the audio-visual files and for verifying their respective file-wrapper information as a part of the downloading process. In addition, memory 206 may include information that is used to determine whether a trigger even has occurred, in order to retrieve and present a correct audio-visual file to a target audience. For example, the triggering event could be a particular time of day or a specific input detected by the sensor block 212, such as certain biometric information, voice, motion, light, sound, etc. The user interface 216, which may include buttons, keys, or a voice recognition module, allows the personalized-messaging device to include user-selectable functionality.

The external-communication interface 218 is used for accessing and downloading the audio-visual files into the PM_Device 102 or can be used as a method to trigger an event initiated from the local computer 104. The external-communication interface 218 may be wired (e.g., USB) or wireless (e.g., Bluetooth, WiFi, etc.)

The control circuit 204 uses the display 208 and speaker(s) 214 to play a selected audio-visual file to a target audience. The display 208 and speaker(s) 214 may also be used to inform an operator of the device status, such as during a file-downloading process. The display could be of any type, such as liquid crystal (LCD), light emitting diode display (LED), organic LED, graphene, etc., and could include backlighting.

Power to the internal components of the personalized-messaging device 102 comes from a power supply 220. The power supply 220 may include a rechargeable or non-rechargeable battery. The power supply 220 may also include voltage-regulation circuits for providing different levels of voltages to the various internal block of the device 102. In case of a rechargeable battery, the personalized-messaging device also include a charger 222 that is electrically coupled to the power supply 220. The charger 222 could be a hardwired charger, an induction charger, or a photovoltaic charger. When the personalized-messaging device uses, a USB interface, the USB port could alternatively be used for both charging and communication.

The above described components of the personalized-messaging device 102 are located in the device's housing 224. The housing 224 further includes a mounting interface 225 for physical coupling of the personalized-messaging device to an associated presentation item, such as a cake, flower bouquet, etc.

Figure 3:
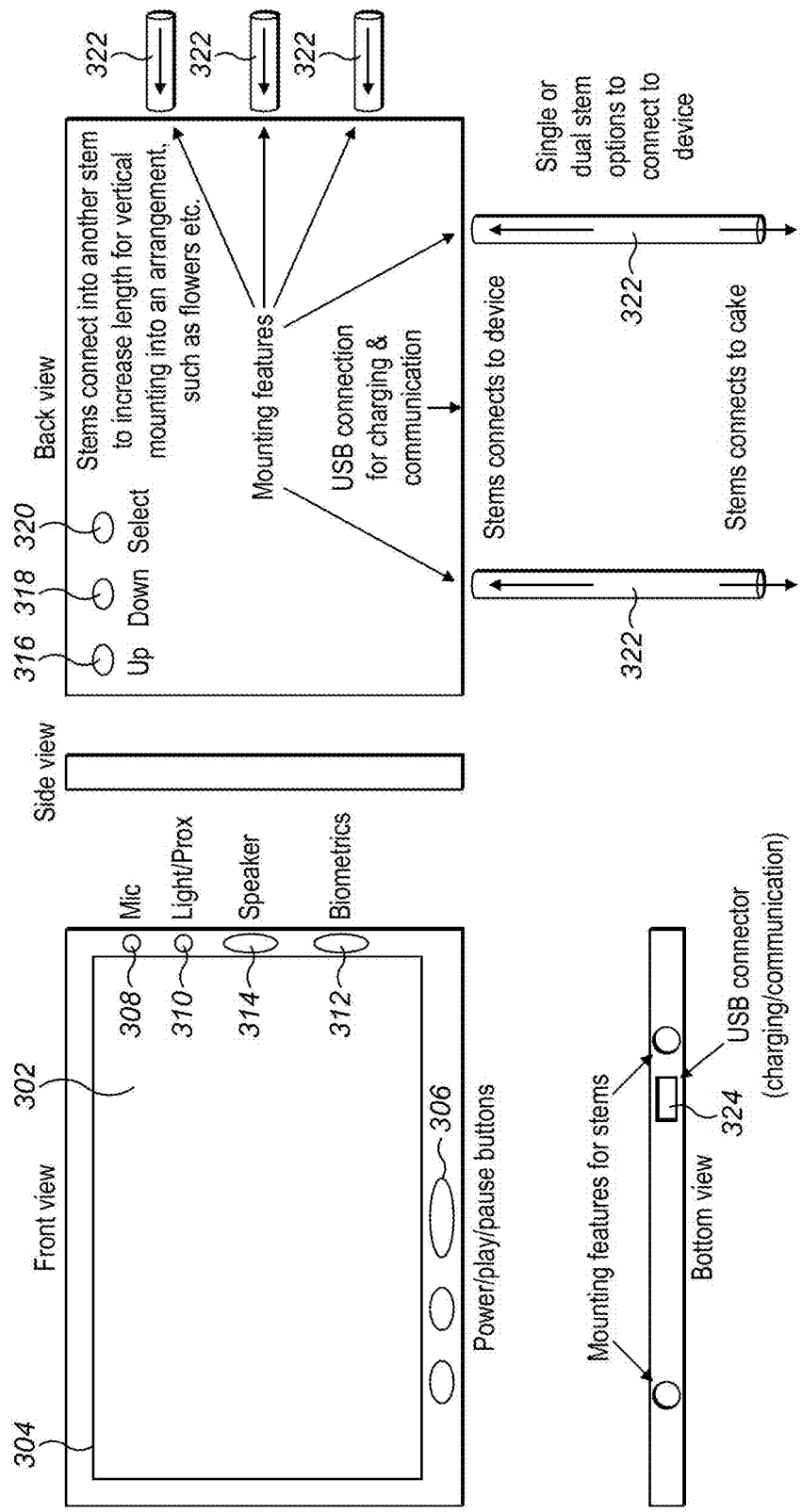
FIG. 3 provides front side, back, and bottom views of a personalized-messaging device in accordance with some embodiments of the present invention.

FIG. 3 provides front, side, back, and bottom views of a personalized messaging device in accordance with some embodiments of the present invention. In FIG. 3, the front view shows a display 302 surrounded by a bezel 304. On the bottom, there is shown a power/play/pause button set 306, which forms a part of the user interface. To the right of the display, FIG. 3 shows several sensors, such a microphone 308, light or proximity sensor 310 and a biometric sensor 312. The invention is not limited to those three sensors and other sensors, known in the art, are within the spirit of the invention. A speaker 314 is also located to the right of the display. Looking at the PM_Device in FIG. 3 from the side, the device has a thin, rectangular shape. The back view in FIG. 3 shows additional user interface buttons 316 (up), 318 (down), and 320 (select) for allowing the user to perform menu controls on the display. The back view of the PM_Device also shows possible locations for the mounting interface (225 in FIG. 2) on the side and the bottom of the device. In FIG. 3, for example, the mounting interface element is a single stem 322 or multiple interlocking stems to extend the length in order to connect to the associated item, such as a cake or a flower bouquet. The bottom view in FIG. 3 illustrates mounting holes for the stem(s) 322 and a USB connector 324 that can be used for both charging and external communication.

FIG. 4 shows how a regular cake can be turned into a unique presentation package in accordance with some embodiments of the present invention.

Figure 5:
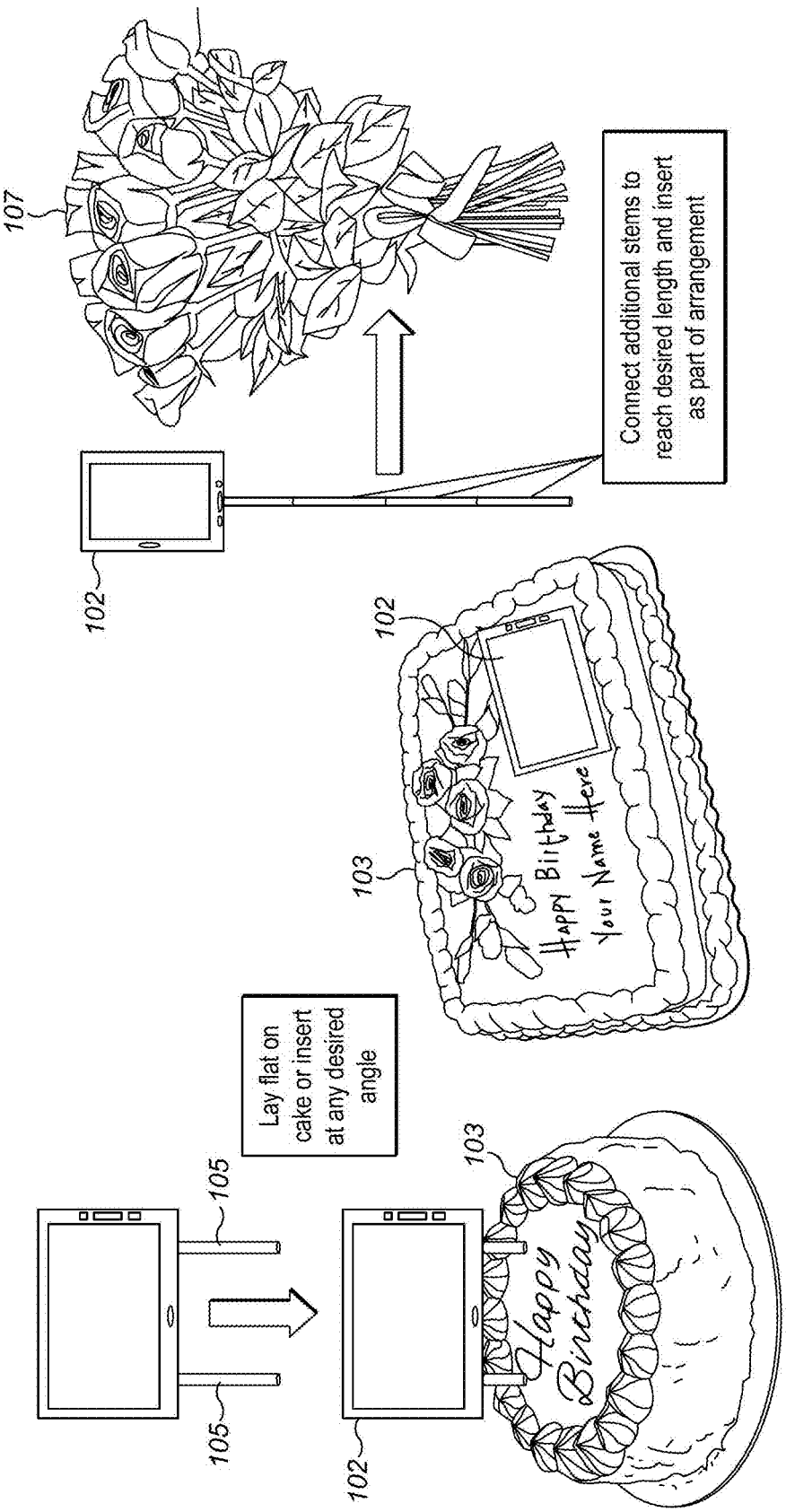
FIG. 5 shows three exemplary options for coupling a personalized-messaging device to an associated presentation item.

FIG. 5 shows three exemplary options for coupling a PM_Device 102 to an associated presentation item. In the center of FIG. 5, the PM_Device 102 is shown mounted on a cake 103 directly, without any additional mounting elements. On the left side of FIG. 5, the PM_Device 102 is shown inserted into a cake 103 via two stems 105, which act as the device's mounting interface. On the right side of FIG. 5, the PM_Device 102 is shown prior to insertion into a flower bouquet 107. In this scenario, the mounting interface, which is used to physically couple the device to the bouquet, is a single stem of variable length. In these scenarios, the PM_Device is physically coupled to a presentation item and forms a part of the overall arrangement.

Figure 6:
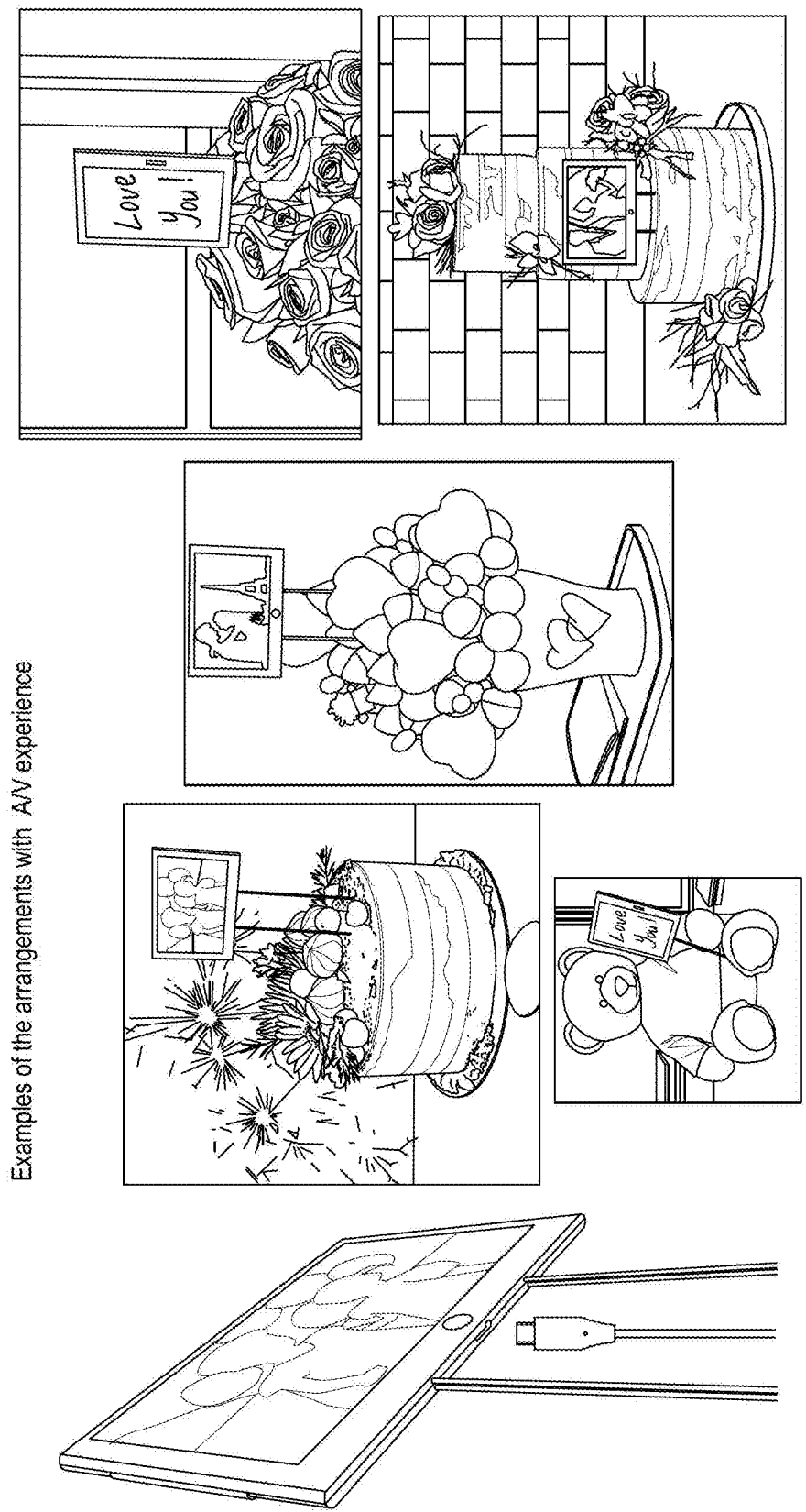
FIG. 6 shows various optional arrangements of a personalized-messaging device and its associated presentation items in accordance with some embodiments of the invention.

FIG. 6 further shows various optional arrangements of the personalized-messaging device and its associated presentation items in accordance with some embodiments of the invention.

Figure 7:
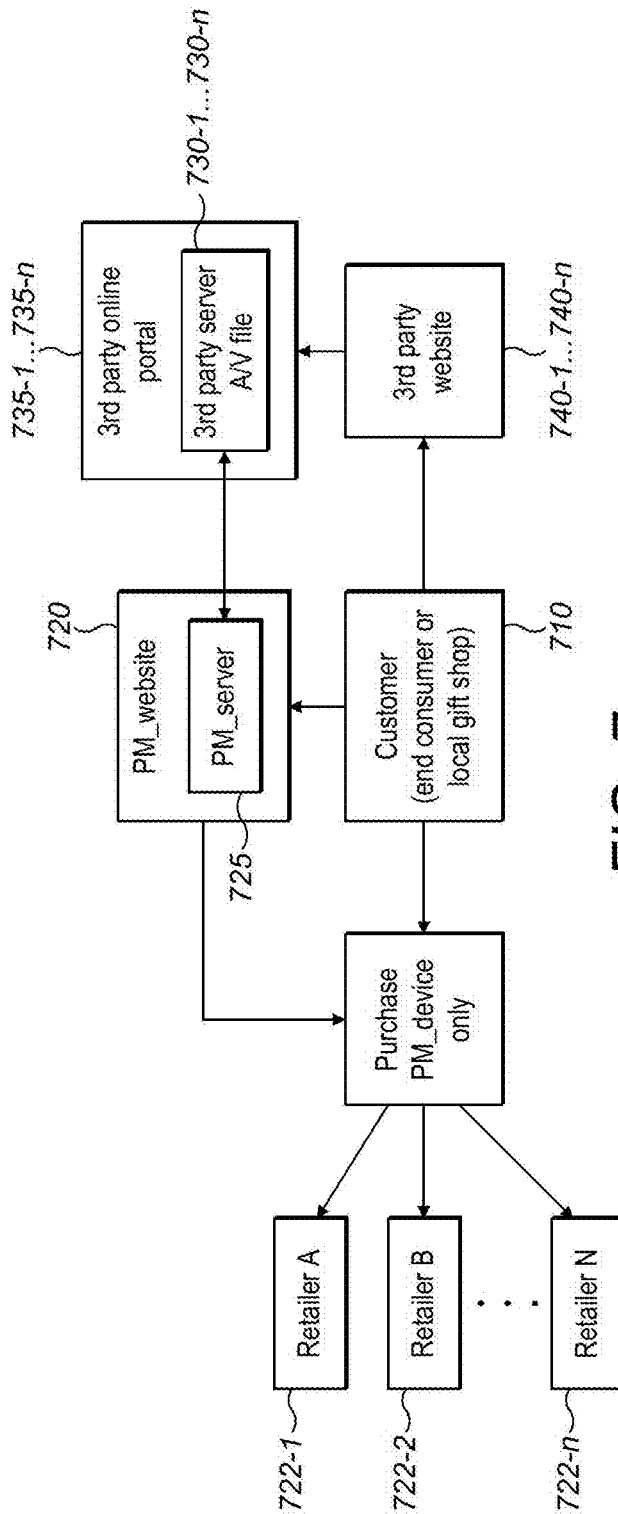
FIG. 7 illustrates a system for providing a personalized-messaging device with an audio-visual file in accordance with some embodiments of the present invention.

FIG. 7 illustrates a system for providing a personalized-messaging device with an audio-visual file. In the embodiment illustrated in FIG. 7, a customer 710 (end consumer or local gift shop) would purchase a personalized-messaging device from one of a number of retailers, designated by the reference numerals 722-1, 722-2, through 722-n, either in a physical store or through the retailer's web site. Using a local computer or mobile smart device/tablet the customer would go to a the personalized-messaging website (the "PM_Website") 720 and use the online tools of the LOCAL APP to create, edit, upload and store the audio-visual files of interest on the PM_Server 725, together with its unique file-wrapper.

In another embodiment, the audio-visual file of interest would originally be located on one of a number of third-party online servers 730-1 through 730-n. Using a local computer or mobile smart device/tablet and using the online tools of the LOCAL APP to create, edit, upload and store the audio-visual files of interest, the customer would confirm the final audio-visual file to use, which would then be processed through the corresponding 3$^{rd}$ party's online portal (735-1 through 735-*n*), accessed through the corresponding 3$^{rd}$ party's website (740-1 through 740-*n*) and uploaded to the PM_Server 725, at which point the file wrapper is created for later download to the PM_Device 102. If the third-party is a gift arrangement company, the customer would not only select the audio-visual file of interest but would also select an associated presentation item. The completed arrangement would either be shipped directly to the customer's chosen address or picked up by the customer at the physical store of the gift-arrangement company. Preferably, regardless of whether an audio-visual file was originally stored on the PM_Server, uploaded to the PM_Server from the Local Computer or mobile smart device/tablet, or uploaded to the PM_Server from a third-party online server, the PM_Device will download the incoming audio-visual file only if it is being downloaded from the PM_Server, via links 118, 120 and 116.

Figure 8:
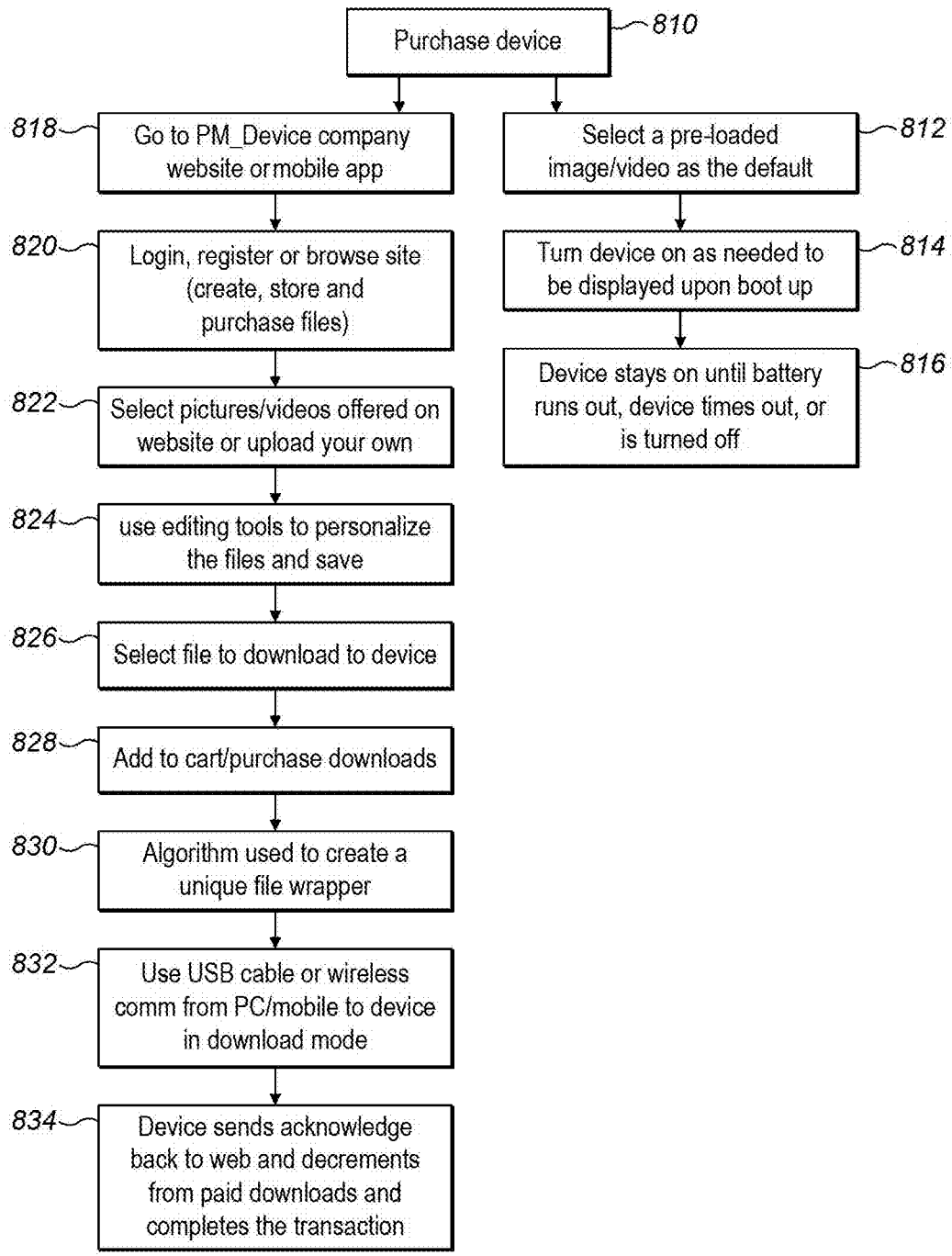
FIG. 8 illustrates a method for providing a personalized-messaging device with an audio-visual file in accordance with some embodiments of the present invention.

FIG. 8 illustrates a method for providing a personalized-messaging device with an audio-visual file. The method starts at Step 810, in which a customer purchases a personalized-messaging device, from any source, with preloaded, default audio-visual files. One way to use the personalized-messaging device is for the customer to select a pre-loaded audio-visual file of interest in Step 812, such that when the personalized-messaging device is coupled with the associated presentation item, the arrangement would be compete. At the time of presentation, the device will play the audio-visual file of interest as a part of the overall presentation arrangement, either by being manually turned on, via a power switch, and selected to play the audio-visual file of interest (see Step 814) or by having the device react to a trigger event such as time or sensory input (not shown). As shown in Step 816, the personalized messaging device will then either stay on until the battery runs out, be turned off manually, or turn off automatically after a predetermined period.

Should the customer be interested in audio-visual files other than the default, preloaded files, the customer could download such files onto the device as well by using the services of the personalized messaging company (the "PM_Company") website shown in Step 818, via a local computer or a mobile smart phone/tablet by using the PM_Company website directly or the PM_company Android or iOS application. Once on the website, in Step 820, the customer could log m, register, or simply browse the site. In order to create, store, and/or to purchase file(s) of interest, the customer would register to create, a personal account. The customer could also upload to the PM_Company's server an audio-visual file from his; her local computer or mobile smart phone/tablet device. The customer could also select the audio-visual file(s) that are offered on the PM_company's website. This is shown in Step 822. Whether selecting and uploading a file from the local computer or from the PM_company's file offerings, the customer could use editing tools to further personalize the file (see Step 824.) Once finished editing, in Step 826, the customer would select the edited file for downloading to the personalized-messaging device. From there, the process would move to Step 828, where the selected file would be added to the customer electronic cart on the PM_Company's website and electronically paid for, thereby incrementing the customers download credit. Once the file has been placed in the customer's electronic cart, the PM_Server would prepare the file for downloading by creating a unique file-wrapper (see Step 830), as well as a file checksum, and encrypting the transmission. Using either a wired communication link (e.g., USB) or a wireless communication link between the PM_Device and Local computer, the encrypted file would then be transmitted from the PM_Server to the personalized-messaging device (see Step 832). Once the personalized-messaging device has received the encrypted file from the server, it would decrypt the file and its file-wrapper, unwrap the file (verify it using an application program), store it, and send an acknowledgement message back to the PM_Server confirming successful download of the audio-visual file and decrementing the pre-paid download credit (see Step 834). In situations where the customer has multiple pre-paid audio-video download credits stored on the PM_server, these download credits will be decremented after the PM_Device acknowledges a successful download of the audio-video encrypted file.

Figure 9:
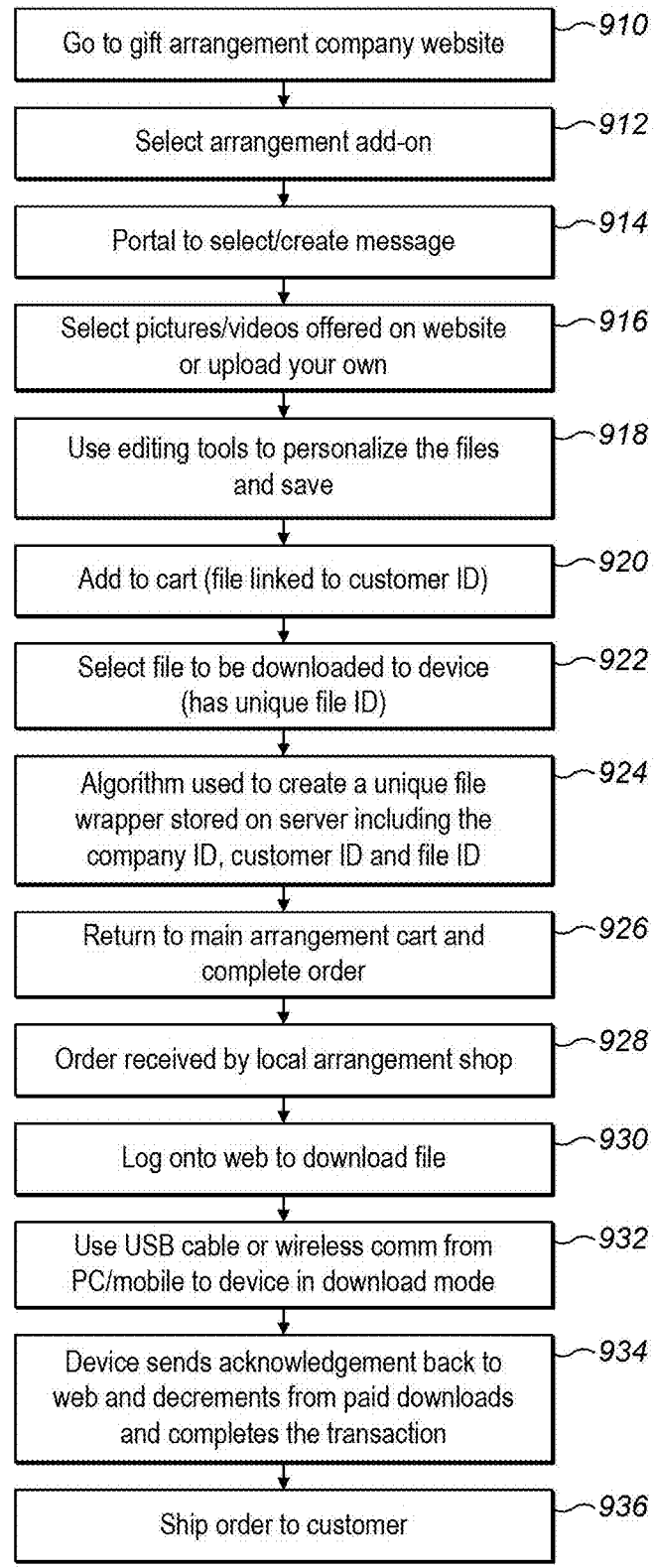
FIG. 9 illustrates a method for providing an arrangement, which includes a personalized-messaging device containing an audio-visual file and a presentation item associated with the personalized-messaging device in accordance with some embodiments of the present invention.
Figure 10:
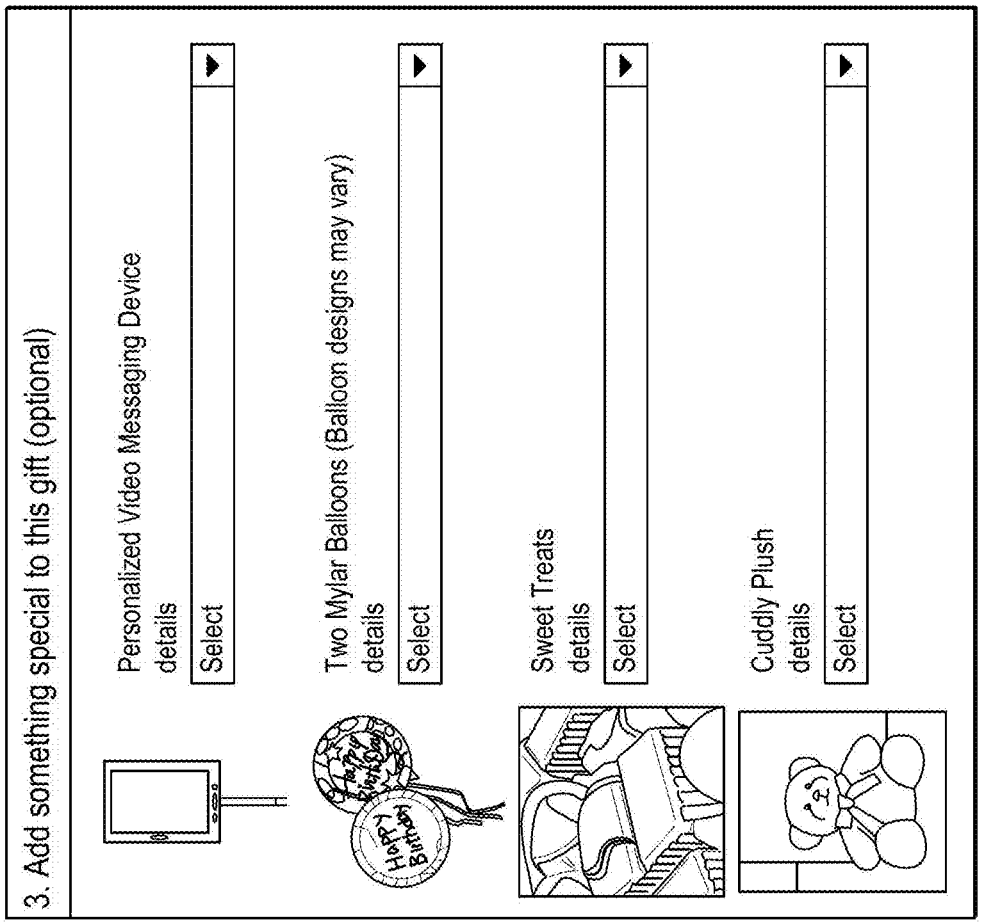
FIG. 10 illustrates an "Arrangement Add-On" webpage for selecting an arrangement and/or creating a personalized audio-visual file.

FIG. 9 illustrates a method for providing an arrangement, which includes a personalized-messaging device containing an audio-visual file and a presentation item associated with the personalized-messaging device in accordance with some embodiments of the present invention. In the method disclosed in FIG. 9, a customer uses a website of a gift-arrangement company 910. In step 912, the customer selects an "Arrangement Add-On" option, which allows the customer to select both a gift item, e.g., flower bouquet, and an audio-visual file for presentation to a target audience. Once the customer has selected the "Arrangement Add-On" option, a window for selecting and/or creating a personalized audio-visual message appears (see Step 914). (See also FIG. 10.) At that point, the customer either selects the pictures and/or videos offered on the gift arrangement company's website or uploads his/her own audio-visual file from another source (see Step 916). In Step 918, the customer can use editing tools to further personalize and save the file on the personalize-messaging company's server (PM_Server). Once the customer is satisfied with the file, it would be added to the customer's electronic shopping cart, at which point the file is associated with the specific customer ID (see Step 920). If multiple files are created, the customer can select the file(s) that are to be downloaded to the PM_Device (see Step 922). An algorithm (e.g., the BACKEND APP) running on the PM_Server creates a unique file wrapper that may include the company ID, customer ID, and/or file ID (see Step 924) and stores it. The PM_Server could also create a check sum of the audio-visual file. After Step 924 has been completed, the customer is returned to a main gift arrangement cart window to complete his/her arrangement order (see Step 926). Once the customer completes the arrangement order, an order notification is received by a local Arrangement Gift Shop (see Step 928). A gift shop employee then logs onto the PM_Company's web portal to download the audio-visual file and its file-wrapper, that is linked to the order (see Step 930) to the PM_Device. Prior to transmission of the audio-visual file and its file-wrapper, the BACKEND APP on the PM_Server may also encrypt the file and its wrapper. The gift shop then uses either a wired or a wireless link to a personalized-messaging device to download the customer's ordered audio-visual file and its file-wrapper (see Step 932). After the personalized-messaging device has received the encrypted file from the server, it decrypts the transmission, unwraps the file, stores it, and sends an acknowledgement message back to the server, confirming successful download of the audio-visual file (see Step 934.) The PM_Server then, decrements the number of paid download credits. Once the selected audio-visual file has been saved on the personalized messaging device, the local Arrangement Gift Shop may also use the appropriate mounting devices (see mounting stems, FIG. 3, item 322) to secure the PM_Device to the arrangement and ship it to the end customer (see Step 936). Alternatively, the customer could pick up the ordered arrangement at the local gift shop.

One possible scenario of operating the personalized-messaging device 102 would be to have a user turn the device on via a power switch of the user interface 216. Once the device is turned on, the external communication interface 218 can be used to access and download an audio-visual file into the device memory 206. During the downloading process, the file and the file wrapper linked to the downloaded audio-visual file are decrypted and verified by the application program ("CLIENT_APP") on the PM_Device, an acknowledgement is sent back to the PM_Server as a continuation. Once the received information has been decrypted and verified, the PM_Device will unlock the file to be played. Decryption, which could be performed using public or private decryption keys, allows secure transfer of files containing sensitive information, such as personal information. Once an audio-visual file has been downloaded, saved in the device's memory 206, and unlocked, the PM_Device can be physically coupled to a presentation item, to create an overall arrangement. The file may then be presented to a target audience upon occurrence of a number of different triggering events.

For example, when a sensor 212, switch 216 or wireless notification 218 detects an external signal, the control circuit 204 processes the external signal and analyzes it, in view of a trigger condition that was previously programmed in the device's memory 206. If the external signal, satisfies the trigger condition, e.g. a voice or a biometric match, the device interprets it as a valid triggering event for presentation of a corresponding audio-visual file. At that point, the controller circuit 204 automatically accesses the appropriate audio-visual file in memory 206 and plays it via the display 208 and/or speaker 214.

In another embodiment, a user can use a cursor (either via a mouse, pointer), a touch screen, or up/down/select buttons to select the appropriate audio-visual file and to play it.

In the foregoing specification, including the exhibits, specific embodiments have been shown and described. However, one of ordinary skill in the art appreciates that various modifications and changes can be made without departing from the scope of the invention as set forth in the claims. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as critical, required, or essential features or elements of any or all of the claims that claim benefit to this application.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements, not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, or contains the element. The terms "a" and "an" are defined as one or more unless explicitly stated otherwise herein. The terms "substantially", "essentially", "approximately", "about" or any other version thereof, are defined as being close to as understood by one of ordinary skill in the art. The term "coupled" as used herein is defined as connected, although not necessarily directly and not necessarily mechanically. A device or structure that is "configured" in a certain way is configured in at least that way but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. A gift arrangement comprising:
   (a) a personalized-messaging device configured to store a version of an audio-visual file and an identification information associated with said audio-visual file, wherein said identification information and the version of said audio-visual file are transmitted by a first server to said personalized-messaging device in an encrypted format, wherein said personalized-messaging device is configured to communicate with said first server through a customer's local computer communicatively coupled to a computer communication network, wherein said audio-visual file is uploaded to said first server from the customer's local computer, and wherein said identification information and the version of said audio-visual file are downloaded from said first server to said personalized-messaging device through the customer's local computer for downloading to said personalized-messaging device via a short-range bidirectional link; wherein said identification information comprises a unique file wrapper that includes a personalized-messaging device company identifier, and wherein said personalized-messaging device returns to said first server an acknowledgement of a successful download: and
   (b) an item physically coupled to said personalized-messaging device by a coupling device to form an arrangement; wherein said personalized-messaging device decrypts the version of said audio-visual file and said identification information transmitted by said first server prior to storing them; and wherein said personalized-messaging device is configured to play the version of said audio-visual file upon occurrence of a triggering event during a presentation of said arrangement to a person, and wherein said personalized-messaging device is configured to record the presentation.

2. The gift arrangement of claim 1, wherein said coupling device is a stem-shaped structure having two ends, one end of which is inserted into a mounting hole in said personalized-messaging device and another end of which is inserted into said item.

3. A personalized-presentation method, said method comprising the steps of:
(a) providing a first server coupled to a computer communication network for storing an audio-visual file and an identification information associated with said audio-visual file;
(b) providing a personalized-messaging device configured to communicate with said first server through a customer's local computer communicatively coupled to said computer communication network, wherein said audio-visual file is uploaded to said first server from the customer's local computer, and wherein said identification information and a version of said audio-visual file are downloaded from said first server to said personalized-messaging device through the customer's local computer for downloading to said personalized-messaging device via a short-range bidirectional link; wherein said identification information comprises a unique file wrapper that includes a personalized-messaging device company identifier, and wherein said personalized-messaging device returns to said first server an acknowledgement of a successful download;
(c) physically coupling said personalized-messaging device with an associated item to form an arrangement; and
(d) playing the downloaded version of said audio-visual file stored on said personalized-messaging device upon said personalized-messaging device detecting a triggering event during a presentation of said arrangement to a person, wherein said personalized-messaging device is configured to record the presentation.

4. The personalized-presentation method of claim 3, wherein said first server is configured to transmit the version of said audio-visual file and said identification information to said personalized-messaging device in an encrypted format and wherein said personalized-messaging device is configured to decrypt the version of said audio-visual file and said identification information prior to the personalized-messaging device being able to play the version of said audio-visual file.

5. The personalized-presentation method of claim 3, wherein said audio-visual file on said first server is modifiable from the customer's local computer.

6. The personalized-presentation method of claim 3, wherein said triggering event is detection of a specific sound.

7. The personalized-presentation method of claim 3, wherein said triggering event is a result of a biometric check.

8. The personalized-presentation method of claim 3, wherein said triggering event is a manual selection of the downloaded version of said audio-visual file via a user interface of said personalized-messaging device.

9. A personalized-presentation system comprising:
(a) a first server coupled to a computer communication network for storing an audio-visual file and an identification information associated with said audio-visual file;
(b) a personalized-messaging device configured to communicate with said first server through a customer's local computer communicatively coupled to said computer communication network, wherein said audio-visual file is uploaded to said first server from the customer's local computer, and wherein said identification information and a version of said audio-visual file are downloaded from said first server to said personalized-messaging device through the customer's local computer for downloading to said personalized-messaging device via a short-range bidirectional link; wherein said identification information comprises a unique file wrapper that includes a personalized-messaging device company identifier, and wherein said personalized-messaging device returns to said first server an acknowledgement of a successful download; and
(c) an item physically coupled to said personalized-messaging device to form an arrangement, wherein said personalized-messaging device is configured to play the downloaded version of said audio-visual file upon occurrence of a triggering event during a presentation of said arrangement to a person, and wherein said personalized-messaging device is configured to record the presentation.

10. The personalized-presentation system of claim 9, wherein said first server is configured to transmit the version of said audio-visual file and said identification information to said personalized-messaging device in an encrypted format and wherein said personalized-messaging device is configured to decrypt the version of said audio-visual file and said file identification information prior to the personalized-messaging device being able to play the version of said audio-visual file.

11. The personalized-presentation system of claim 9, wherein said audio-visual file on said first server is modifiable from the customer's local computer.

12. The personalized-presentation system of claim 9, wherein said triggering event is detection of a specific sound.

13. The personalized-presentation system of claim 9, wherein said triggering event is a result of a biometric check.

14. The personalized-presentation system of claim 9, wherein said triggering event is a manual selection of the downloaded version of said audio-visual file via a user interface of said personalized-messaging device.

15. The personalized-presentation system of claim 9, wherein said personalized-messaging device is configured to decrement a value of customer's pre-paid download credits on said first server.

16. The personalized-presentation method of claim 3, further comprising a step of decrementing a value of customer's pre-paid download credits on said first server.

* * * * *